W. V. TURNER.
LOCOMOTIVE BRAKE EQUIPMENT.
APPLICATION FILED OCT. 21, 1916.

1,299,268.

Patented Apr. 1, 1919.
4 SHEETS—SHEET 2.

INVENTOR
Walter V. Turner
by Wm. M. Cady
Atty.

W. V. TURNER.
LOCOMOTIVE BRAKE EQUIPMENT.
APPLICATION FILED OCT. 21, 1916.

1,299,268.

Patented Apr. 1, 1919.
4 SHEETS—SHEET 3.

INVENTOR
Walter V. Turner
by Wm. M. Cady
Atty.

W. V. TURNER.
LOCOMOTIVE BRAKE EQUIPMENT.
APPLICATION FILED OCT. 21, 1916.

1,299,268.

Patented Apr. 1, 1919.
4 SHEETS—SHEET 4.

AUT.

Fig. 11. RELEASE

Fig. 6. RELEASE

Fig. 12. LAP

Fig. 7. LAP

Fig. 13. SERVICE

Fig. 8. SERVICE

Fig. 14. EMERGENCY

Fig. 9. QUICK SERVICE

Fig. 15. HOLDING

Fig. 10. HANDLE OFF

INVENTOR
Walter V. Turner
by Wm. M. Cady
Atty.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

LOCOMOTIVE-BRAKE EQUIPMENT.

1,299,268.  Specification of Letters Patent.  Patented Apr. 1, 1919.

Application filed October 21, 1916. Serial No. 126,869.

*To all whom it may concern:*

Be it known that I, WALTER V. TURNER, a citizen of the United States, residing at Wilkinsburg, in the county of Allegheny and State of Pennsylvania, have invented new and useful Improvements in Locomotive-Brake Equipments, of which the following is a specification.

This invention relates to fluid pressure brakes, and more particularly to a locomotive brake equipment.

It has heretofore been proposed to employ a locomotive brake equipment in which there is provided a distributing valve device having an application piston subject to the opposing pressures of an application chamber and the brake cylinder for controlling the application and release of the brakes on the locomotive. The pressure in the application chamber may be controlled either by an equalizing valve device operating with the triple valve devices in the train, according to variations in pressure in the automatic train brake pipe, or independently by directly supplying and releasing fluid to and from the application chamber through the manipulation of an independent brake valve.

It is highly desirable to be able to independently apply and release the brakes quickly on the locomotive, particularly when operating on grades, or in shifting about in making up a train and the like, but with the increasing length of locomotives, both electrical and steam, the possibility of having the distributing valve located at one end of the train, remote from the controlling brake valve, and in double or triple heading, the length of the independent application and release pipes is such that an application or release of the brakes may be unduly delayed and furthermore, even where an automatic brake application is made, the independent application pipe being in communication with the application chamber, the volume of the chamber is increased, so that the desired rise in brake cylinder pressure per pound of reduction in brake pipe pressure is not obtained.

While a long independent release pipe will not ordinarily interfere with an automatic application of the brakes, in holding position, in which this release pipe is blanked at the automatic brake valve, since the equalizing valve device of the distributing valve has been forced to release position, the release pipe will be open to the application chamber and where the release pipe is long, this may cause a drop in pressure in the application chamber and a corresponding partial release of the locomotive brakes.

In order to secure a quicker application and release of the brakes, one object of my invention is to provide a locomotive brake equipment of the above character in which the brakes are applied and released independently by operating the equalizing valve device in the same manner as in making an automatic application and release of the brakes.

Other objects and advantages will appear in the following more detailed description of the invention.

In the accompanying drawings.

According to the embodiment illustrated in the drawings, the locomotive brake equipment may comprise a distributing valve device 1, an automatic brake valve 2, and an independent brake valve 3, which may be applied to the casing of the automatic brake valve 2, as shown.

Figure 2:
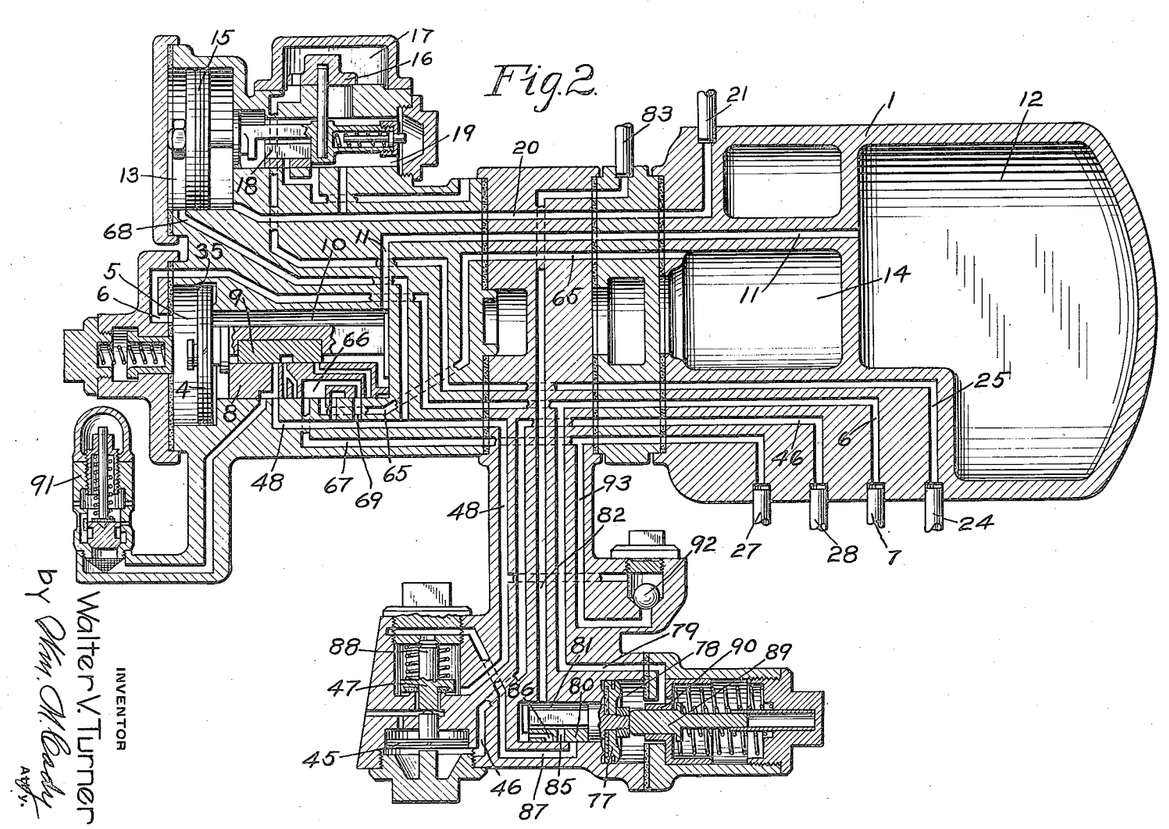
Fig. 2 a central sectional view of the distributing valve device.

The distributing valve device 1 may comprise an equalizing valve device having a piston 4 contained in piston chamber 5, connected by a passage 6 to an independent brake pipe 7 and having a main slide valve 8 and a graduating valve 9 contained in valve chamber 10 and adapted to be operated by piston 4.

The valve chamber 10 is connected by passage 11 to a pressure chamber 12 and the valves 8 and 9 control the admission and release of fluid under pressure to and from an application cylinder 13, normally connected to an application chamber 14 and containing an application piston 15.

The piston 15 is adapted to operate a brake cylinder supply valve 16 contained in valve chamber 17 and a release valve 18, contained in chamber 19 which is connected by passage 20 and pipe 21 to brake cylinders 22.

Valve chamber 17 is connected to main reservoir 23 through pipe 24 and passage 25.

Figure 1:
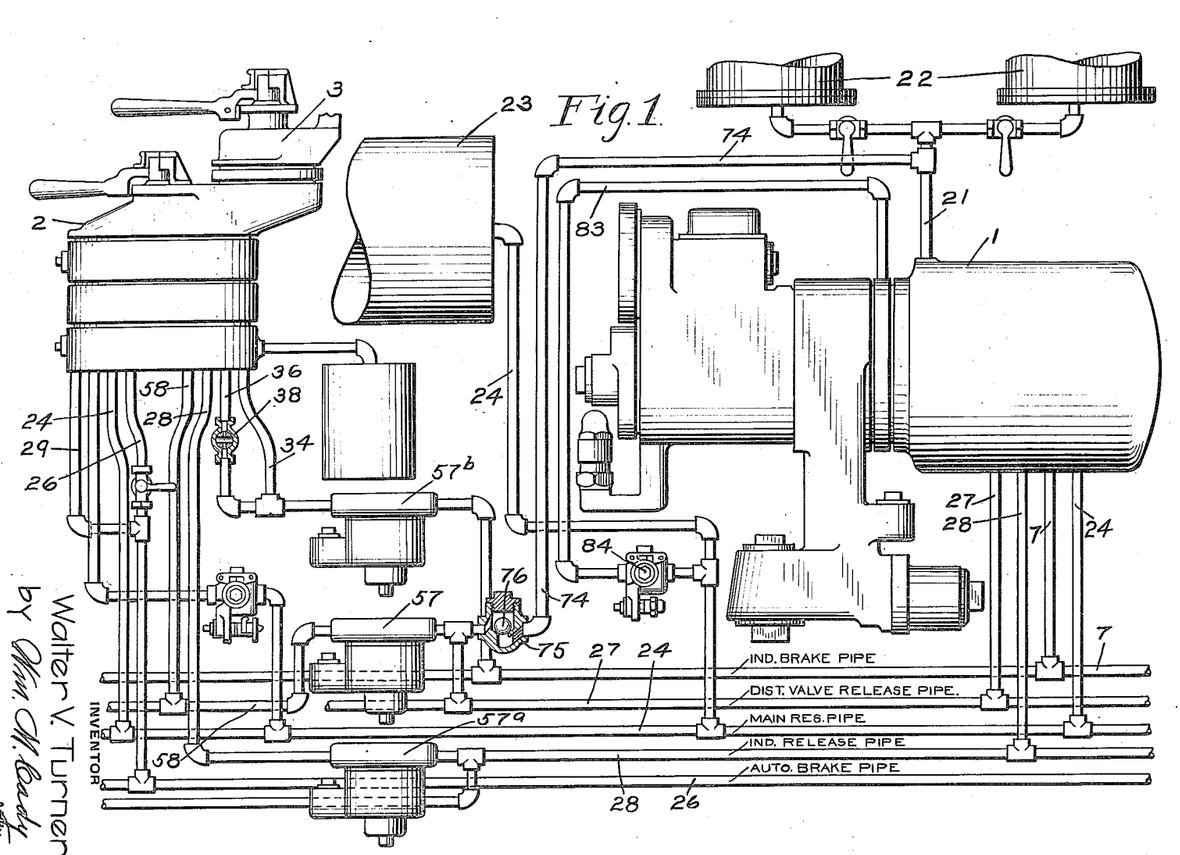
Figure 1 is a diagrammatic view of a locomotive fluid pressure brake equipment embodying my invention.

According to my invention, in order to control the brakes on the locomotive and the train, in addition to the hereinbefore mentioned independent brake pipe 7 there is provided the usual automatic brake pipe 26, a distributing valve release pipe 27, and an independent release pipe 28.

Figures 3, 5, 16:
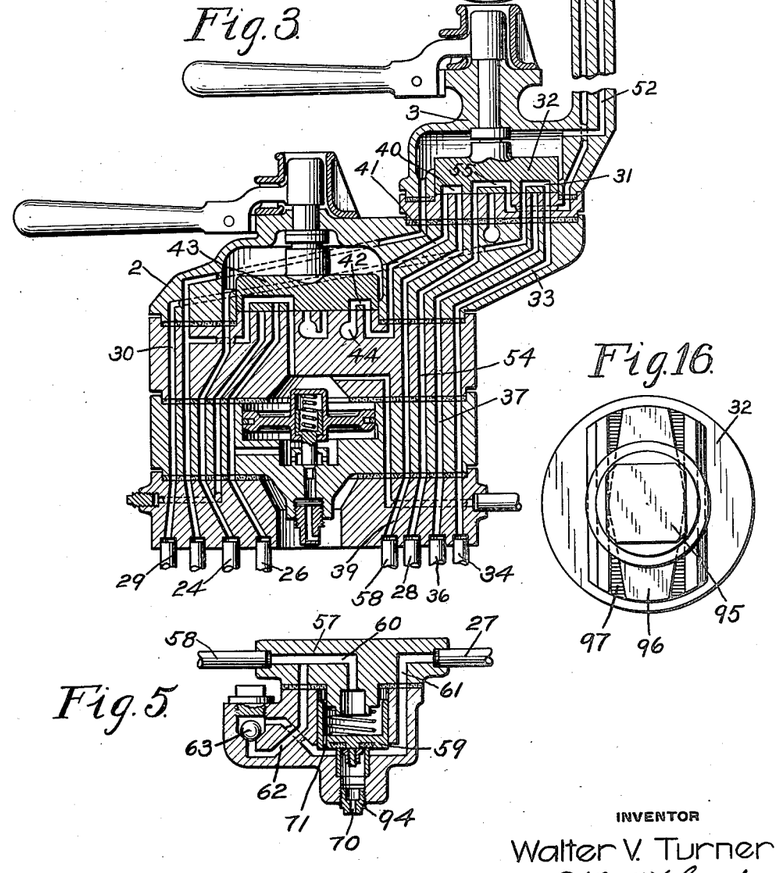
Fig. 3 a central sectional view of the combined automatic and independent brake valve device.
Fig. 5 a central sectional view of the quick release valve device.
Fig. 16 a plan view of the independent brake valve, with the casing removed.
Figure 4:
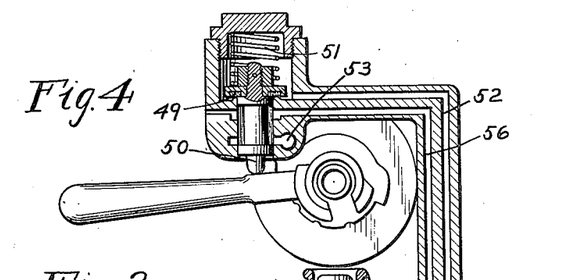
Fig. 4 a plan view thereof, showing the independent release portion in section.

In operation of the apparatus so far described, when running over the road, the automatic and the independent brake valve handles are placed in running position, as shown in Fig. 3 of the drawings. In this position, the independent brake pipe 7 is connected to the automatic brake pipe 26, through a branch pipe 29 leading from the automatic brake pipe 26, passage 30, cavity 31 in the rotary valve 32 of the independent brake valve 3, passage 33 and branch pipe 34 leading to the independent brake pipe 7. It will thus be seen that in running position, the independent brake pipe 7 is charged with fluid at the standard pressure carried in the automatic brake pipe and from the pipe 7, fluid flows through passage 6 to piston chamber 5 and thence through the feed groove 35 around piston 4 to valve chamber 10 and the pressure chamber 12.

Since the independent brake pipe is open to the automatic brake pipe when running along the road, should the brake pipe pressure be reduced by a break-in-two, bursted hose or the like, an emergency application of the brakes will be obtained on the locomotive as well as on the train.

Figure 8:
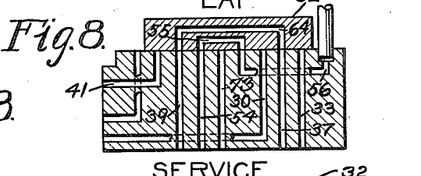

If it is desired to effect an independent service application of the brakes on the locomotive, the independent brake valve is turned to service position, as shown in Fig. 8 of the drawings, the automatic brake valve being left in running position, in which fluid is vented from the independent brake pipe and the equalizing piston chamber 5 through branch pipe 36, passage 37, cavity 64 in the independent rotary valve 32, passage 39 and pipe 58, to the distributing valve release pipe 27. The equalizing piston 4 then moves the slide valves 8 and 9 so as to connect the pressure chamber 12 with application cylinder 13. Fluid flows to the application cylinder until the pressure in the pressure chamber has been reduced to, or slightly less than, the pressure in the independent brake pipe, when the equalizing piston 4 moves the graduating valve 9 in the usual manner to cut off further flow to the application cylinder.

The application piston 15 is then operated by the pressure in the application cylinder, so as to open the application valve 16 and supply fluid to the brake cylinders 22.

According to my invention, in making a reduction in pressure in the independent brake pipe, fluid is vented to the distributing valve release pipe 27 instead of to the atmosphere, so as to limit the amount of reduction which can be made, to the pressure at which the pressure chamber will equalize into said release pipe, as it is not desirable to obtain the high brake cylinder pressure in an independent locomotive brake application as would be obtained by a full reduction in pressure on the equalizing piston. The distributing valve release pipe 27 is normally maintained at atmospheric pressure when the brake valves are in running position by connecting same to the exhaust through passage 39, cavity 40 in rotary valve 32, passage 41, cavity 42, in the rotary valve 43 of the automatic brake valve 2, and exhaust port 44.

In order to regulate the rate of reduction in making an independent application of the brakes to correspond with one, two, or more locomotives, a separate branch pipe 36 connects the independent brake pipe 7 through a passage 37 to the seat of the independent rotary valve, and in this pipe is interposed a cock 38 provided with a plurality of different sized ports, so that by turning this cock to the proper position, the required rate of flow can be obtained.

Figure 7:
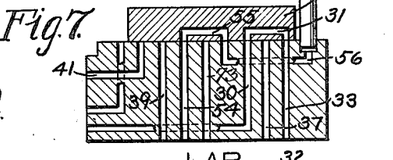

When the desired reduction in independent brake pipe pressure has been obtained, the independent brake valve handle may be turned to lap position as shown in Fig. 7 in which, as in running position, the independent brake pipe is connected to the automatic brake pipe by cavity 31 in the rotary valve of the independent brake valve.

In lap position, the independent release pipe 28 is closed to the exhaust and the distributing valve release pipe 27 is blanked by the rotary valve of the independent brake valve, so that while the independent brake pipe is charged with fluid under pressure from the automatic brake pipe and thereby the equalizing piston 4 is shifted to release position, the locomotive brakes will not be released.

It will now be evident that if the independent brake valve is turned to lap position after making an inependent application of the brakes, an automatic emergency application of the brakes will be obtained on the locomotive when the brake pipe pressure is suddenly reduced from any cause without the necessity for moving the independent brake valve handle to running position.

In order to secure a prompt independent release of the brakes on the locomotive, a release valve device is provided, comprising a piston 45 having the chamber at one side connected to the independent release pipe 28 by a passage 46 and adapted to operate a release valve 47 for venting fluid from the application cylinder 13, through passage 48.

On the independent brake valve 3 there is provided a pilot valve 49 having a stem 50 adapted to be engaged by the independent brake valve handle. The valve 49 is normally held seated by a spring 51 and by fluid pressure supplied to the spring side of the valve through a passage 52 leading to the rotary valve chamber of the independent brake valve.

When the valve 49 is seated, and the rotary valve 32 is in running position, the independent release pipe is connected to an exhaust port 53 through passage 54, cavity 55, and passage 56, and similarly, in lap position, said cavity in the independent rotary valve connects passages 54 and 56, so that the release valve will also be held closed in this position.

Figure 6:
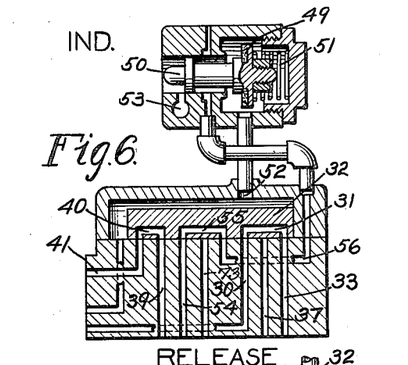
Figs. 6 to 10 inclusive, diagrammatic sectional views of the independent brake valve, showing the relation of ports and passages in the respective positions of independent release, lap, service, quick service, and handle off.

Upon movement of the independent brake valve handle to release position, however, as shown in Fig. 6, the stem 50 is actuated to lift the valve 49 from its seat and close the exhaust port 53. Fluid is then admitted from the independent rotary valve chamber through passage 52 to the independent release pipe 28 and thence flows through passage 46 to the piston 45, thereby operating same to open the valve 47 and thus effect the quick exhaust of fluid from the application cylinder 13.

As in running position, the independent brake pipe is still connected to the automatic brake pipe, so that the equalizing piston 4 will be controlled by variations in pressure in the automatic brake pipe.

The end of the stem 95 which engages the independent rotary valve is designed to permit a certain amount of lost motion, as shown in Fig. 16 of the drawings, in which the engaging portion 96 is tapered outwardly from the center, so that the end portion can rock within the slot 97 of the rotary valve.

By reason of the above construction, after the brake valve handle has been moved to release position, it is only necessary for the spring 51 to return the handle and the stem 95, the lost motion between the stem and the rotary valve preventing movement of the rotary valve, and consequently, the closing of the release valve is always assured, since there is no variable and uncertain resistance of a rotary valve to be overcome in the movement.

An important feature of the release valve construction is that in case of breakage of the independent release pipe, the brakes on the locomotive will not be released, since the release valve is only opened to permit release of the brakes by supplying fluid to the release pipe 28 and consequently if the release pipe should break, the brakes will not be released. It will be noted that the release valve device is associated with the distributing valve device so that there are no pipes employed except the independent release pipe.

When the brakes on the locomotive are to be released automatically with the train brakes by operation of the automatic brake valve, fluid is exhausted from the application cylinder 13 of the distributing valve device through the distributing valve release pipe 27 and in order to secure a quick release of the locomotive brakes in this case, a relay release valve device 57 is inserted in a branch pipe 58 of the distributing valve release pipe 27, leading to the independent brake valve, the release valve being located in a branch pipe instead of the main pipe, so that in double or triple heading, the release valves will all be operated regardless of the relative positions of the ends of the locomotive with respect to the other locomotives.

As shown in Fig. 5 of the drawings, the release valve device 57 may comprise a casing containing a valve piston 59 having one side connected by passage 60 to branch pipe 58 and the opposite side by passage 61 to the distributing valve release pipe 27. In order to permit the supply of fluid under pressure to the application cylinder 13 of the distributing valve device upon manipulation of the brake valve to effect an emergency application of the brakes, a by-pass 62 containing a non-return check valve 63 connects passages 60 and 61.

In order to release the locomotives brakes with the train brakes, the automatic brake valve is first turned to release position to release the train brakes and then to running position, as shown in Fig. 3 of the drawings, and the branch pipe 58 is connected to the exhaust port 44 through passage 39, cavity 40 in rotary valve 32, passage 41, and cavity 42 in the automatic rotary valve 43.

The spring side of valve piston 59 is therefore subject to atmospheric pressure while the opposite side is subject to the pressure in the application chamber 14 of the distributing valve device, since the equalizing valve device has been shifted to release position by the increase in brake pipe pressure effected upon movement of the automatic brake valve to running position. In release position, the application chamber 14 is connected by passage 65 through cavity 66 with passage 67 leading to the distributing valve release pipe 27 while the application cylinder 13 is also connected to the distributing valve release pipe through passages 68, 48, and 69.

The application chamber pressure acting on the inner face of valve piston 59 operates to lift the piston from its seat and permit the rapid exhaust of fluid from the application chamber to exhaust port 70, so that a quick release on the locomotive is effected.

When the application chamber pressure has been reduced to a low point, the valve piston 59 will close, and the remaining fluid in the application chamber will then be exhausted through the restricted port 71 in the valve piston 59 to the exhaust port 44 in the automatic brake valve.

It will be noted that upon movement of the independent brake valve to release position, the distributing valve release pipe 27 is connected to exhaust port 44 through cavity 40, so that the release valve 57 is operated to quickly exhaust the pressure in the distributing valve release pipe and thus the pipe will be at atmospheric pressure so as not to interfere with making another independent application of the brakes, as promptly as may be desired.

It will also be noted that while the greater part of the independent exhaust from the application chamber is effected by operation of the release valve 47, the action is assisted by the additional venting of fluid from the application chamber through distributing valve release pipe and the release valve 57.

In order to facilitate the quick operation of the release valve 47, in case it is desired to apply and release the brakes in quick succession, a valve device 57ª may be inserted in the independent release pipe 28. This valve device may be substantially of the same construction as the release valve device 57, previously described, and in operation, when the brakes on the locomotive are to be released, fluid supplied to the pipe 28 flows through the by-pass passage 62 in the valve device 57ª and thence to the piston 45 of the release valve device, operating the same as hereinbefore described. If it is desired to make another application of the brakes, the movement of the independent brake valve to application position connects the pipe 28, through passage 54 and cavity 55 with the exhaust port 53 of the pilot valve 49, so that fluid is vented from the valve piston 59 and the same is opened to quickly reduce the pressure in pipe 28 and on piston 45, thus insuring the prompt closing of release valve 47.

The independent brake valve is also provided with a quick application position for obtaining an independent application more rapidly and at a somewhat higher pressure than can be obtained in the independent service position.

Figures 9, 14:
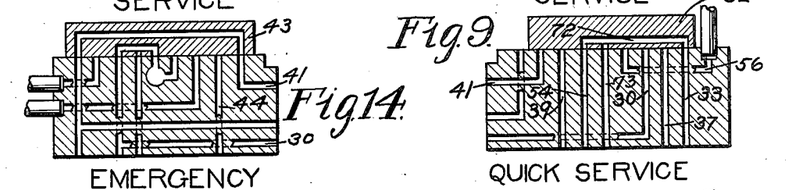
Figs. 11 to 15 inclusive, diagrammatic sectional views of the automatic brake valve device, showing the relation of ports and passages in the respective positions of release, lap, service, emergency and holding.

In this position, fluid is vented rapidly from the independent brake pipe 7 through the direct unrestricted pipe 34, as shown in Fig. 9, and through a cavity 72 in the rotary valve 32 to an exhaust port 73. The quicker reduction in brake pipe pressure thus produced operates to shift the equalizing piston 4 to emergency position, in which the application chamber 14 is cut off from the application cylinder 13, so that the pressure chamber 12 equalizes only into the application cylinder 13. A higher equalizing pressure is thus produced and a correspondingly higher brake cylinder pressure is obtained.

In order to provide for a more rapid venting of fluid from the independent brake pipe in making an automatic emergency application of the brakes, a valve device 57ᵇ may be interposed in the pipe 34.

Figures 10, 15:
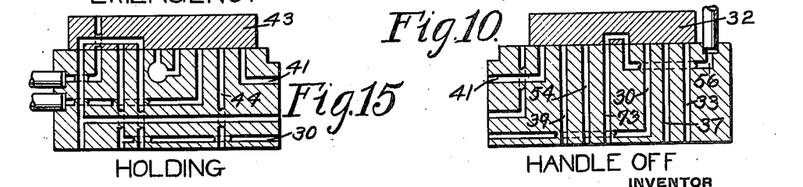
Figure 11:
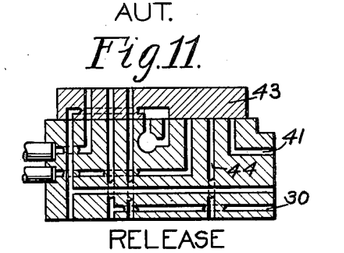
Figure 12:
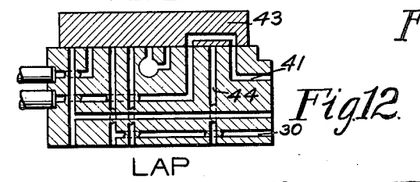
Figure 13:
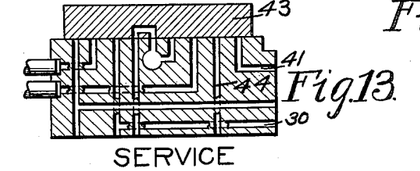

The construction of this valve device may be the same as the valve device 57 hereinbefore described, and in operation, upon movement of the independent brake valve to the quick service position, fluid is vented from the spring side of the valve piston 59 at a greater rate than it can flow through the restricted port 71, so that the same is opened and fluid is rapidly exhausted from the independent brake pipe by way of the exhaust port 70.

Where the brakes on the locomotive and train have been applied automatically and it is desired to hold the brakes on the locomotive while the brakes are released on the train, the automatic brake valve is turned to holding position, as shown in Fig. 15 of the drawings. In this position, fluid is vented from the brake pipe and the triple valves in the train as well as the equalizing valve on the locomotive are shifted to release position. The distributing valve release pipe 27 is held closed in this position, so as to prevent the release of the brakes on the locomotive, but especially where this pipe is long, there will be some reduction in pressure in the application cylinder by flow to the distributing valve release pipe upon movement of the equalizing valve device to release position.

In order to prevent such reduction, a pipe 74 containing a choke 75 and connecting the brake cylinders with the release pipe 27 is provided, so that when the brakes are applied fluid will be supplied from the brake cylinders to the distributing valve release pipe and thus prevent a reduction of pressure in the application cylinder of the distributing valve device by flow to the release pipe. A check valve 76 is also interposed in the pipe 74 for preventing back flow from the release pipe to the brake cylinder in an automatic emergency application of the brakes, where fluid is supplied at high pressure through ports in the brake valve to the distributing valve release pipe.

Where independent applications and releases of the brakes are made in quick succession, particularly quick service applications, the brake pipe pressure may be reduced below the equalizing point as well as the pressure in the pressure chamber, so that the desired braking pressure may not be obtained. In order to maintain the braking power under such conditions, means are provided for automatically supplying fluid to, and maintaining the pressure in, the application cylinder of the distributing valve device upon an over reduction in brake pipe pressure.

For this purpose, a piston 77 contained in piston chamber 78 may be provided. The piston chamber 78 is connected by a passage 79 to the independent brake pipe passage 6 and the piston 77 is adapted to operate a valve 80 contained in valve chamber 81 which is connected by a passage 82 to a pipe 83 containing a pressure reducing valve 84 for limiting the pressure supplied from main reservoir pipe 24 to the valve chamber 81.

The valve 80 is provided with a large port 85 and a restricted port 86 adapted to register in different positions with a passage 87 which is controlled by a valve 88 carried by the release valve 47 and adapted when the release valve is closed to open communication from passage 87 to passage 48 leading to the application cylinder.

In operation of this feature of my invention, if the independent brake pipe pressure should become reduced to a predetermined undesirable degree below the equalizing point, the pressure in valve chamber 81 will be sufficient to overcome the reduced brake pipe pressure and the pressure of a spring stop 89 and cause the movement of piston 77 and slide valve 80 so that the large port 85 registers with passage 87, this position being defined by the engagement of the piston 77 with a second spring stop 90. In this position, fluid will be supplied through the reducing valve 84 to passage 87 and thence past valve 88 to passage 48 and the application cylinder 13, thus providing means for maintaining the pressure in the application cylinder.

If the reducing valve 84 should become disabled, so that fluid at main reservoir pressure is supplied to valve chamber 81, it would be undesirable to permit fluid at this high pressure to flow to the application cylinder, since it would produce an excessive brake cylinder pressure, and in order to prevent this, the piston 77 is adapted to be moved by the main reservoir pressure, overcoming the resistance of the second spring stop 90, so that the restricted port 86 is brought into register with passage 87. The size of the restricted port 86 is such that the excess flow due to the main reservoir pressure will escape at the safety valve 91 rapidly enough to prevent an excess pressure in the application chamber, the safety valve being connected to the application cylinder in the emergency position of the equalizing piston 4.

The above arrangement is such that even after the release is started, the pressure may still be maintained in the application cylinder and thus delay or prevent release, and in order to prevent this, the valve 88 is provided which closes communication through which the maintaining valve 80 supplies fluid upon operation of the release piston 45 to effect the release of the brakes.

Where there is only one locomotive, the opposite ends of the distributing valve release pipe are closed, so that although the application cylinder is connected to the release pipe, no fluid can escape when the brakes are applied. If, however, two or more locomotives are connected together, and a break-in-two should occur, it will be seen that the distributing valve release pipe is opened to the atmosphere.

In order to prevent loss of the brakes by flow, in such cases, from the application cylinder to the release pipe, a check valve 92 is interposed in the passage 93 which connects passage 48 with passage 67.

In order to adjust the rate of release on the locomotive when releasing the brakes automatically, to correspond with the rate of release on the cars of the train, the exhaust port 70 of the release valve device 57 may be located in a removable plug 94, so that by employing a plug having the necessary size exhaust port 70, the time of release may be made as desired for the particular locomotive.

Having now described my invention, what I claim as new, and desire to secure by Letters Patent, is:—

1. In a fluid pressure brake, the combination with an automatic brake pipe normally charged with fluid under pressure, of an independent brake pipe and an independent brake valve having a position for charging the independent brake pipe with fluid under pressure from the automatic brake pipe and adapted upon movement from said position to another position to vent fluid solely from the independent brake pipe for effecting an independent application of the brakes.

2. In a fluid pressure brake, the combination with an automatic brake pipe normally charged with fluid under pressure, of an independent brake pipe and an independent brake valve for venting fluid solely from the independent brake pipe to apply the brakes and for supplying fluid from the automatic brake pipe to the independent brake pipe for releasing the brakes.

3. In a fluid pressure brake, the combination with an automatic brake pipe normally charged with fluid under pressure, of an independent brake pipe and an independent brake valve having a position for charging the independent brake pipe with fluid under pressure from the automatic brake pipe and another position in which fluid is vented solely from the independent brake pipe to effect an independent application of the brakes and adapted upon movement from the brake application position to another position to supply fluid from the automatic brake pipe to the independent brake pipe to thereby effect the independent release of the brakes.

4. In a fluid pressure brake, the combination with an automatic brake pipe normally charged with fluid under pressure, of an independent brake pipe, an independent release pipe, and an independent brake valve having a position for connecting the automatic brake pipe with the independent brake pipe, a position for venting fluid from the independent brake pipe to effect an independent application of the brakes, and a position for connecting the automatic brake pipe with the independent brake pipe and for varying the pressure in the independent release pipe to effect an independent release of the brakes.

5. In a fluid pressure brake, the combination with a brake pipe and a valve device operated according to variations in brake pipe pressure for controlling the brakes, of an independent release pipe and a release valve associated with said valve device and operated by an increase in pressure in said release pipe for effecting the release of the brakes.

6. In a fluid pressure brake, the combination with a brake pipe, a controlling valve device having an application cylinder, an increase in pressure in which is adapted to effect an application of the brakes, and an equalizing valve device subject to brake pipe pressure for controlling the pressure in said application cylinder, of an independent release pipe and a release valve device associated with the controlling valve device and adapted to be operated by an increase in pressure in the release pipe for effecting an independent release of the brakes.

7. In a fluid pressure brake, the combination with a brake pipe and a valve device operated by variations in brake pipe pressure for controlling the application and release of the brakes, of a brake valve for controlling the brakes automatically, a release pipe, a release valve operated by an increase in pressure in the release pipe for effecting the release of the brakes, and an independent brake valve for controlling the pressure in said release pipe.

8. In a fluid pressure brake, the combination with a brake pipe, and a valve device operated by variations in brake pipe pressure for controlling the brakes, of a release pipe connected to said valve device and a brake valve for venting fluid from the brake pipe to said release pipe for effecting an application of the brakes.

9. In a fluid pressure brake, the combination with a brake pipe and a brake controlling valve device having an application cylinder, a piston subject to the pressure in said application cylinder for controlling the brakes, and an equalizing valve device subject to brake pipe pressure for varying the pressure in said application cylinder, of a release pipe connected to said application cylinder in releasing the brakes and a brake valve for venting fluid from said brake pipe to the release pipe for effecting an application of the brakes.

10. In a fluid pressure brake, the combination with a brake cylinder and a valve device for controlling the admission and release of fluid under pressure to and from the brake cylinder, of a release pipe having a restricted communication with the brake cylinder and connected to said valve device for controlling the release of the brakes.

11. In a fluid pressure brake, the combination with a brake cylinder, brake pipe, and a distributing valve device having an application cylinder, variations in pressure in which is adapted to control the admission and release of fluid to and from the brake cylinder, of a distributing valve release pipe adapted to be connected to said application cylinder in releasing the brakes and having a restricted communication with the brake cylinder.

12. In a fluid pressure brake, the combination with a brake cylinder, a brake pipe, and a valve device operated upon an increase in brake pipe pressure for effecting the release of fluid from the brake cylinder, of a release pipe connected to said valve device and having a restricted communication with the brake cylinder and a brake valve having a position for increasing the brake pipe pressure to release the brakes and in which the release pipe is connected to the exhaust.

13. In a fluid pressure brake, the combination with an automatic brake pipe, variations in pressure in which control the brakes on the train, of an independent brake pipe variations in pressure in which control the brakes on the locomotive and an independent brake valve having an application position in which fluid is vented from the independent brake pipe and release, running, and lap positions in which the independent brake pipe is connected to the automatic brake pipe.

14. In a fluid pressure brake, the combination with an automatic brake pipe and a distributing valve device having an application cylinder, variations in pressure in which controls the brakes, of a distributing valve release pipe adapted to be connected to the application cylinder and a brake valve device having an emergency position for suddenly reducing the brake pipe pressure and for supplying fluid under pressure to the distributing valve release pipe.

15. In a fluid pressure brake, the combination with a brake pipe and a distributing valve device having an application cylinder, variations in pressure in which is adapted to control the brakes, of a source of fluid under pressure and a valve device subject to the opposing pressures of the brake pipe and said source of fluid under pressure and operated upon a predetermined reduction in brake pipe pressure for supplying fluid from said source to the application cylinder.

16. In a fluid pressure brake, the combination with a brake pipe and a distributing valve device having an application cylinder, variations in pressure in which is adapted to control the brakes, of a maintaining valve device subject on one side to brake pipe pressure and on the opposite side to a pressure normally limited to substantially correspond with the brake pipe pressure and normally operated upon a predetermined reduction in brake pipe pressure for supplying fluid to the application cylinder, said maintaining valve device being further operated when the brake pipe pressure is opposed by a higher fluid pressure to supply fluid to the application cylinder through a restricted port.

17. In a fluid pressure brake, the combination with a distributing valve device having an application cylinder, variations in pressure in which is adapted to control the application and release of the brakes, of a release valve device for controlling the release of fluid from the application cylinder and a maintaining valve device for controlling the admission of fluid to the application chamber through a communication controlled by said release valve device.

18. In a fluid pressure brake, the combination with a distributing valve device having an application cylinder, variations in pressure in which is adapted to control the application and release of the brakes, of a maintaining valve device for controlling the admission of fluid to the application cylinder and a release valve device for controlling the release of fluid from the application cylinder and adapted in releasing fluid to close communication through which the maintaining valve device supplied fluid to the application cylinder.

In testimony whereof I have hereunto set my hand.

WALTER V. TURNER.